United States Patent [19]

Tout

[11] 4,067,177

[45] Jan. 10, 1978

[54] HARVESTER REEL

[75] Inventor: William R. Tout, Ames, Iowa

[73] Assignee: Universal Harvester Company, Inc., Ames, Iowa

[21] Appl. No.: 712,889

[22] Filed: Aug. 9, 1976

[51] Int. Cl.² .............................................. A01D 57/02
[52] U.S. Cl. ....................................................... 56/226
[58] Field of Search ..................................... 56/219–227

[56] References Cited

U.S. PATENT DOCUMENTS

| | | | |
|---|---|---|---|
| 1,770,077 | 7/1930 | Kunz | 56/226 |
| 2,431,397 | 11/1947 | Harrison | 56/226 |
| 2,795,921 | 6/1957 | Hume | 56/226 |
| 3,546,863 | 12/1970 | Connolly | 56/226 |

*Primary Examiner*—Russell R. Kinsey
*Attorney, Agent, or Firm*—Lothrop & West

[57] ABSTRACT

A harvester reel having a shaft is journalled on a supporting frame of a harvesting vehicle for rotation relative to the frame about a main horizontal, transverse axis. A pair of mounting arms are axially spaced apart on and fixed to the shaft, which may be tubular. Extending parallel to the axis and journalled on the two arms is a bat rotatable with respect to the arms for movement about a bat axis parallel to the main axis. At least at one end the bat has a crank carrying a crank pin with a crank axis offset from but parallel to the bat axis. Fixed on the main frame is a circular guide symmetrical about a guide axis eccentric from and parallel to the main axis. A follower, like an eccentric strap, is mounted to rotate on the circular guide. A rod connection to the follower extends to a journal connection on the crank pin. Usually, the reel includes a number of similarly mounted bats, and all but one of the rods is connected to the follower by journal connections having their axes parallel to the main axis, the one follower omitting the pivot connection to the guide and being fixed relative thereto.

9 Claims, 8 Drawing Figures

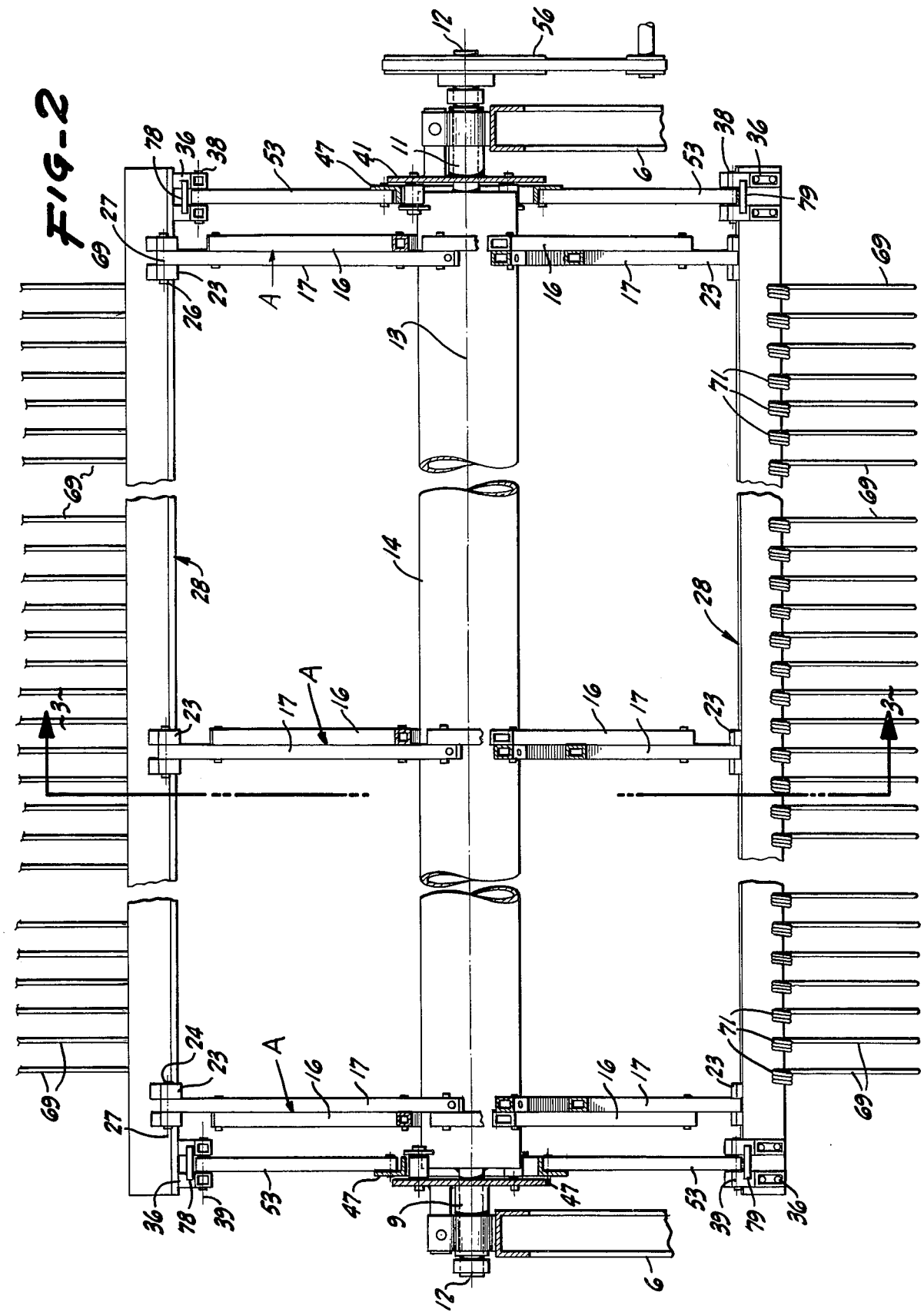

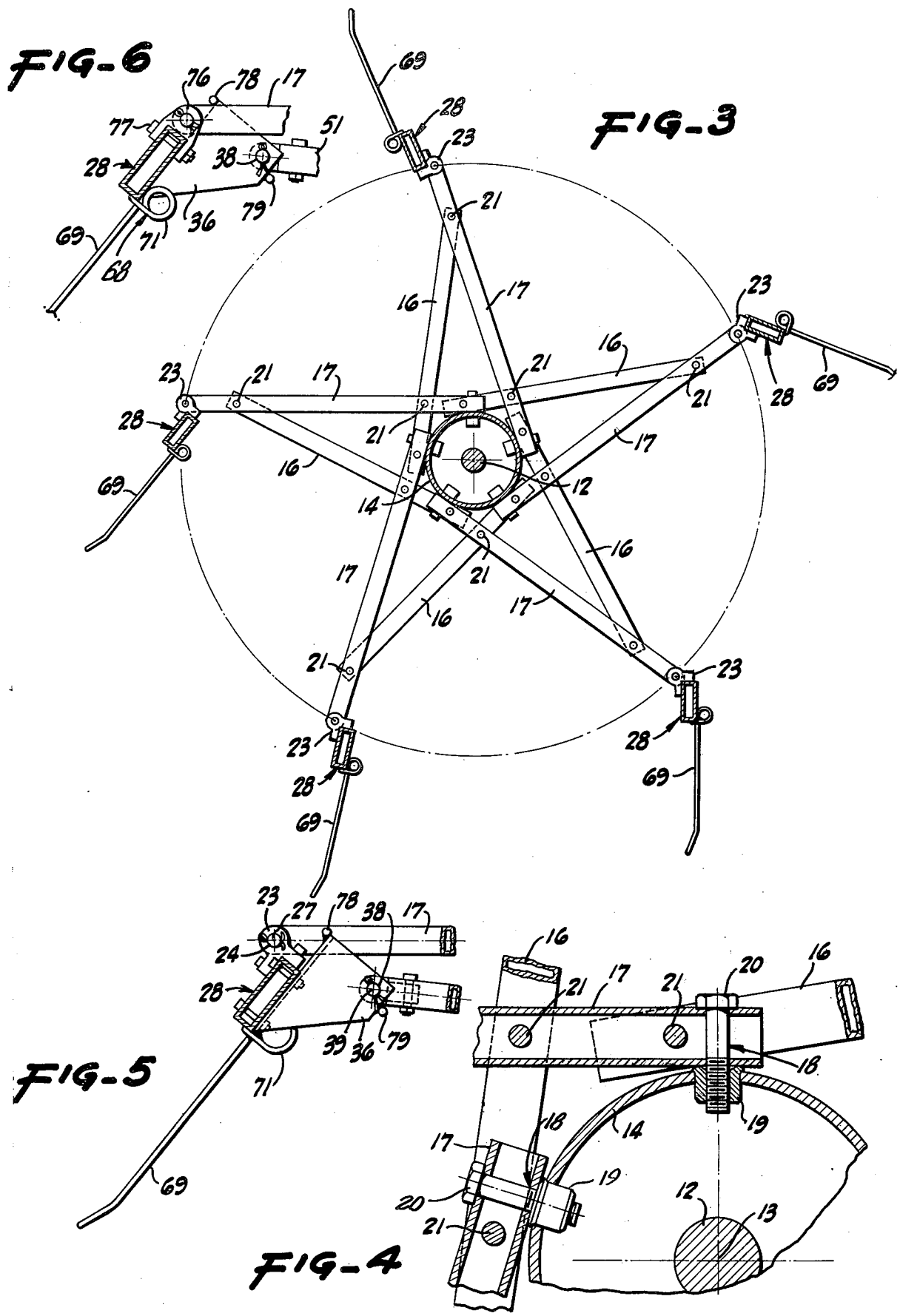

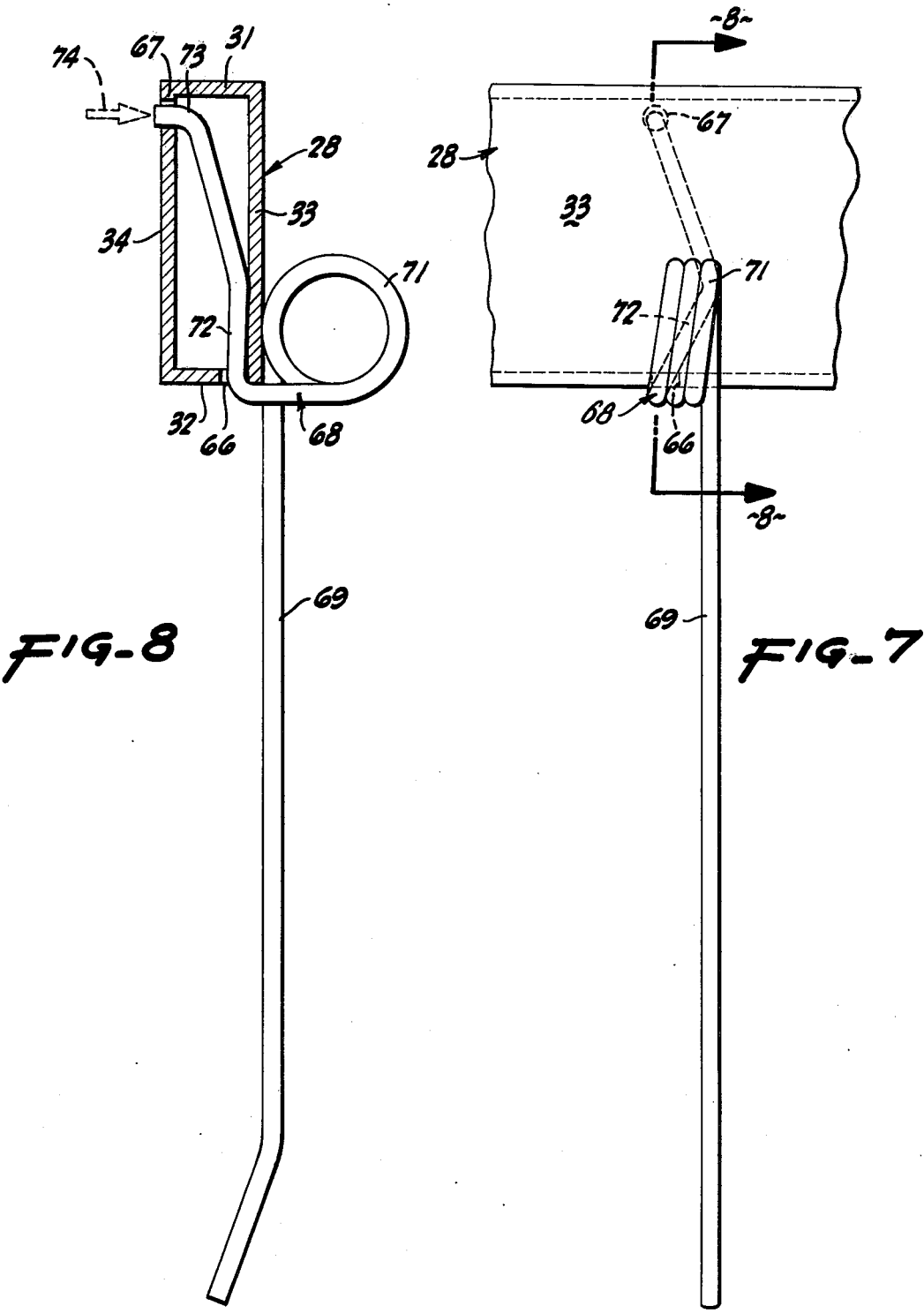

HARVESTER REEL

BRIEF SUMMARY OF THE INVENTION

The harvester reel has a number of bats carrying tines arranged for motion about a main transverse horizontal axis, each bat being arranged to oscillate about its own bat axis parallel to the main axis. The bats are individually driven through rods having their inner ends moving generally eccentric to the main axis and having their outer ends journalled to cranks fixed relative to the bats. One of the connecting rods is fixed with respect to the eccentric strap, so that upon rotation of the reel about the main axis the eccentric strap oscillates the various cranks and bats through approximately 170° each, thereby maintaining the bats in planes approximately parallel to each other during the motion of the bats through most of the lower portion of the reel rotation.

In the harvesting of standing grain and like agricultural materials and for picking up various agricultural products that have been windrowed or are otherwise disposed just above the surface of the ground and transferring them from the ground to either a harvester or through a windrow pickup or comparable mechanism, there is customarily provided some sort of a main frame which is mobile in the field, usually under power, and which advances in a predetermined direction or along a row in the field. The receiver on the main frame for the harvested material may be a draper or a conveyor belt of some sort or can even be a bin or comparable receptacle. There is customarily a transverse framework on the main frame and propelled thereby over the surface of the ground just above the material to be picked up and in some instances at or adjacent the base plane of grain to be cut. A draper is usually advanced on such a framework, and in the event the machine does cutting then there is a cutter bar arranged horizontally and transversely at the leading edge of the draper.

To assist in moving any standing material through the cutting mechanism and onto the draper or to assist in picking up and transferring into a bin or to the draper whether or not a cutter bar is utilized, a reel is employed. This is customarily a rotating device having a transverse rotational axis disposed at a considerable height above the ground. The reel is provided with radial arms at the other ends of which are bats extending parallel to the reel rotational axis and revolved in a direction so that their lower travel assists the material cut or being picked up to move rearwardly.

In some instances the bats are fixed on the ends of the radial arms, but numerous earlier patents disclose the bats mounted on the outer ends of the radial arms for some sort of rotational movement of a circular feathering nature. Patents of this sort are U.S. Pat. Nos. 3,546,863, 3,585,815 and 3,667,198. These afford a rotary, orbiting bat action so that the bats in every position remain substantially parallel to themselves and retain a generally upright attitude as they rotate throughout the reel motion.

While the operation of such a reel is satisfactory from most aspects and such a reel is effective to transfer the grain or other material rearwardly either over a cutter bar or otherwise into a receiving structure, nevertheless the machinery requisite to produce the indicated motion is often relatively complex, requires various bearings and driving devices, and while in many regards is satisfactory, in other respects is subject to improvement.

It is therefore an object of the invention to provide a harvester reel in which the mechanism for producing feathering of the bats is greatly simplified.

Another object of the invention is to provide a harvester reel that includes a small number of rather easily serviced and installed parts.

Another object of the invention is to provide a harvester reel of considerable length without the necessity of interrupting the reel construction at axial intervals for bearings, support devices and the like.

A further object of the invention is to provide a harvester reel in which feathering action is attained in a unique, simple and straightforward fashion.

Another object of the invention is to provide a harvester reel in which relatively light parts are sufficiently stiff to withstand repeated heavy loading.

Another object of the invention is to provide a harvester reel that can easily be used in place of more complicated reels.

A further object of the invention is to provide a harvester reel in which the tine mechanism can be easily serviced.

Another object of the invention is to provide a generally improved harvester reel.

BRIEF DESCRIPTION OF THE SEVERAL VIEWS OF THE DRAWING

FIG. 2 is a cross-section, the plane of section being indicated by the line 2—2 of FIG. 1.

FIG. 3 is a cross-section, the plane of section being indicated by the line 3—3 of FIG. 2.

FIG. 4 is an enlarged cross-sectional detail, the plane of section being indicated by the line 4—4 of FIG. 2.

FIG. 5 is an elevational detail of one form of connection to a bat.

FIG. 6 is an elevational detail of another form of the connection to a bat.

FIG. 7 is a side elevation of a bat showing the connection of the tine therewith.

FIG. 8 is a cross-section, the plane of section being indicated by the line 8—8 of FIG. 7.

DETAILED DESCRIPTION

Figure 1:
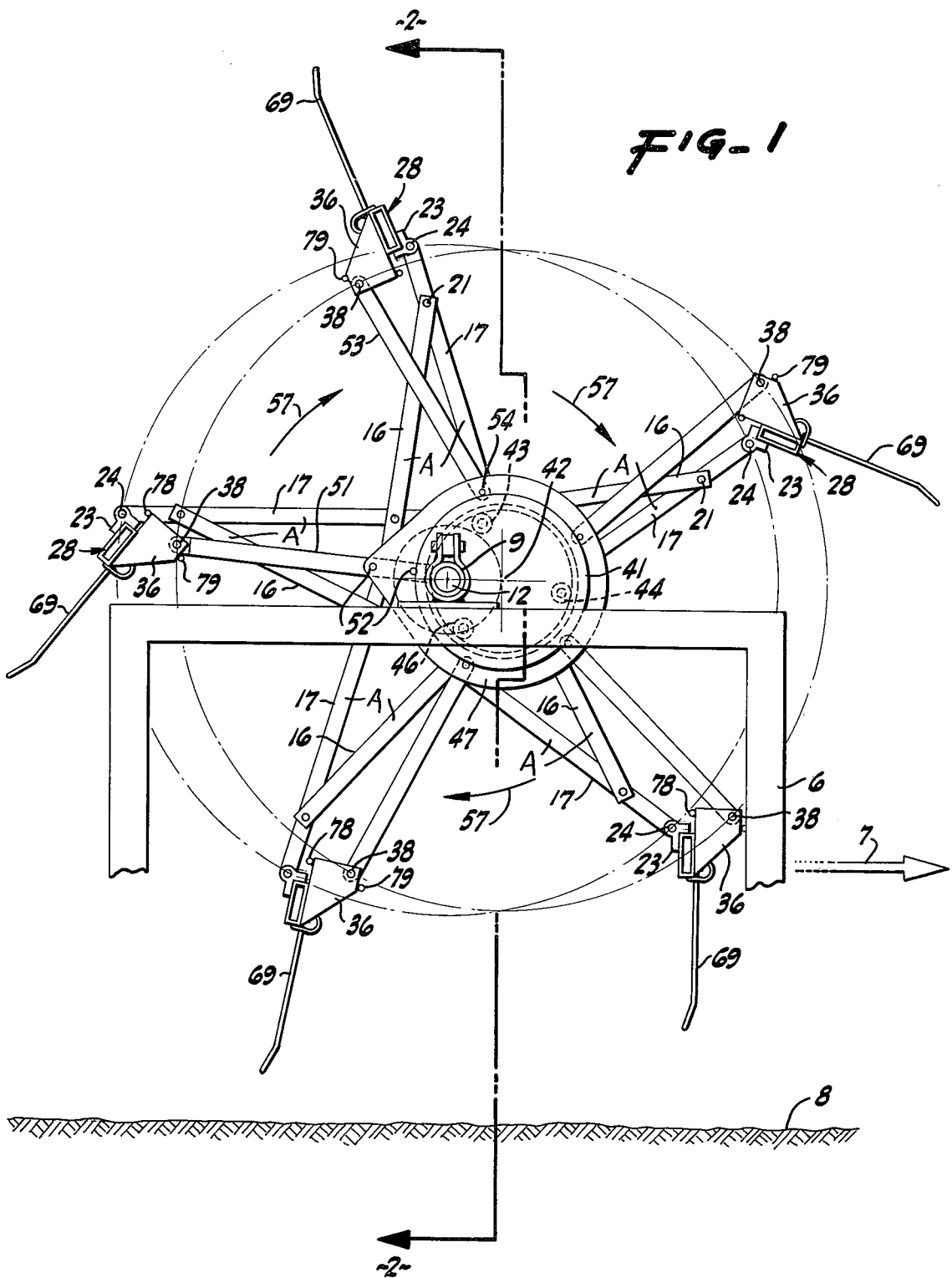
FIG. 1 is an end elevation of a reel constructed pursuant to the invention, parts of the associated machine frame being broken away.

In a typical or representative installation, there is a frame 6; for example, the frame of a windrow or harvesting machine, adapted to be advanced in the direction of the arrow 7 over and slightly above the ground 8 on which the material to be gathered is supported. The frame has supports spaced apart in a direction transverse to the arrow 7, and on such frame supports there are provided journal bearings 9 and 11 for a main drive shaft 12 rotatable about a main axis 13. The shaft 12 is conveniently solid at its ends but intermediate the ends is preferably enlarged into a pipe-like or tubular form 14, all concentric with the axis 13.

Appropriately secured to the shaft tangentially at suitably spaced axial intervals and secured to each other are pairs of struts 16 and 17 together forming light but stiff mounting arms A.

All of the struts 16 and 17 as well as comparable struts used elsewhere on the main shaft are secured in position by fasteners 18 (FIG. 4) including a threaded nut 19 firmly secured in the wall of the shaft and receiving a bolt 20 holding each strut substantially tangent to the surface of the shaft, the pairs of struts 16 and 17 being overlapped and circumferentially spaced on opposite tangents to provide a nearly triangular array. The struts 16 and 17 are secured to each other between their ends and elsewhere and are secured to each other adjacent their radially outward ends by through bolts 21 carrying fastening nuts. It is customary to provide a number of pairs of struts around the periphery of the pipe 14 to form a convenient number of arms A, somewhat like a star, in end elevation. Herein there are five such strut pairs in any one array of arms A extending generally in a plane normal to the axis 13. There are several arrays between one end of the pipe and the other; for example, three such arrays, as shown herein.

In order that appropriate bats can be supported, the struts 16 and 17 or one of them is extended slightly beyond the other and is provided with a bearing fitting 23 (FIG. 5) aligned with comparable bearing fittings in other strut mechanisms. All together the fittings effectively support a bat shaft 24 at one end and a comparable bat shaft 26 at the other end as well as intermediate, similar shafts, if used. The bat shafts are thus aligned along a bat axis 27. Although suitable round members can be utilized as the bats, it is preferred instead to utilize round shafts simply at the two ends and at intermediate locations and between such shafts and firmly secured thereto to utilize a box bat 28. This is conveniently a section of extruded aluminum or the like having a generally narrow rectangular cross-section and straight in a transverse direction and running without interruption for the full length of the reel parallel to the axis 13. The box section (FIG. 8) includes a radially inner wall 31, a radially outer wall 32 and side walls 33 and 34.

Although each of the bats can be fully rotatable about its respective bat axis 27, it is preferred in accordance with the present invention to use something less than a full, circular rotation. For that reason, at least one of the bat ends such as the end near the shaft 24 is fixed to a crank 36 (FIG. 5) having a predetermined offset and carrying a crank pin 38 concentric with a crank pin axis 39 parallel to the bat axis 27 and, or course, to the main axis 13. Movement of the crank about the axis 27 simultaneously rotates the bat along its entire length. With this construction, the bat is quite stiff and needs very few supports intermediate its ends. The character of the bats and their connections is such as to require something less than full bat rotation. Even though there is an intermediate support or supports, the continuity of the bat itself need not be interrupted by fully-rotational journal bearings and the like.

In order to drive all of the bats to provide a desired amount of feathering motion and to provide only as much feathering motion as is needed and without any overtravel, there is provided a mechanism that oscillates each of the bats about its respective bat axis 27 through an arc which ideally might be 180° but which in practice is somewhat smaller, being of the order of 170° or a few degrees more or less. This amount of oscillation is more than adequate to position the bats properly and substantially parallel to themselves as they move about the main axis 13 through the lower portion of the bat travel path an arcuate distance of about 170° or thereabouts.

To produce the desired motion, there is provided on the frame 6 at one end thereof a circular guide generally designated 41. While this guide can be an eccentrically positioned plate such as a circular plate having a bearing rim centered on a guide axis 42 parallel to but offset from the main axis 13, it is preferred in this instance to utilize an equivalent circular guide. This is embodied as a number of rollers 43, 44 and 46 (FIG. 1) having shafts mounted stationarily with respect to the frame and with the peripheries of the rollers all inscribed in a circle having its center on the guide axis 42.

Encompassing the rollers 43, 44 and 46 is a follower ring 47. This ring is rotatable with respect to the circular guide rollers 43, 44 and 46 since it rests thereon in a rotary bearing engagement. The circular guide or follower ring 47 is connected to one of the crank pins 38 by a master rod 51 fixed to the guide ring against pivotal motion by a pair of fasteners 52. In this way, the ring 47 and the master rod 51 are held against relative motion. The circular guide ring 47 is connected to the remaining crank pins 38 by side rods 53 pivoted by the pins 38 and by pins 54.

The proportions and relationships are such as to follower ring eccentricity and crank pin radius that when the main shaft 12 is rotated about the axis 13 by any suitable drive 56, the desired bat oscillation is attained. The rotation is in the direction of the arrow 57. As the reel shaft 12 is rotated and as it carries the arms A including the struts 16 and 17 with it, the bats and the bat shafts are also carried bodily around the axis 13. As this rotation occurs, the eccentricity of the circular guide 41 produces an oscillatory movement of the crank pins and corresponding rotary oscillations of the individual bats. The arrangement is such that each bat is substantially perpendicular to the ground 8 throughout most of the lower half of the reel rotation, as shown in FIG. 1. This is the desired motion. The bat rocks around its own axis 27 or with respect to its shaft 24 throughout an approximate half rotation during approximately half of the total movement around and beneath the shaft axis 13. The bat then returns through approximately a half rotation about its own axis 27 for the remaining half rotation of the reel about the reel axis 13.

In some instances it may be desirable to have something equal to or more than 180° bat motion about the bat axis. In that instance the rod and crank arm interconnection can be replaced by a gear rack on the connecting rod engaging a gear pinion on and concentric with the bat axes. This usually, however, requires additional lubrication and housing, and at present the crank pins with master rod and side rod interconnections are preferred, as the desired amount of motion can be attained without complication. Also, as an alternative, the follower ring 47 can be journalled on an eccentric plate as described, but for superior lubrication, opportunity for adjustment and ease of servicing, it is presently preferred to utilize the various eccentrically mounted circular guide wheels 43, 44 and 46.

While the bats, as described, can be utilized alone, it is preferred to provide them, in most instances, with additional spring tines effective to engage the ground or nearly to engage the ground to assist in sweeping in and engaging fallen grain or windrowed material and the like.

For that reason, each of the bats throughout its length has paired apertures 66 and 67 (FIGS. 7 and 8) provided therein in the walls 32 and 34, for example, at axially spaced intervals. There is provided an especially configured wire tine 68 having a projecting finger 69 yielding partly by virtue of a coil 71 in the tine. The coil length is positioned flat against an adjacent wall 33 of the bat and has an offset portion 72 therein as well as an end hook 73.

For initial installation, the hook 73 is threaded through the aperture 66 into and through the interior of the box bat 28 and then is lodged in the aperture 67, the end of the hook resting substantially flush with the surface of the bat wall 34. In that location the offset 72 lies against the inside of the opposite wall 33 of the bat. The spring coil 71 takes a position in which the finger 69 is free to bend to and fro, and the base of the mechanism is firmly held in position rotationally, longitudinally and transversely without any additional securing devices. After the initial installation or if in use one of the tines wears down excessively or even breaks, it is a simple matter to press a drift 74 or punch against the hooked end 73 of the tine, driving it back to the inside of the bat box and slightly laterally away from the aperture 67. It is then easy manually to maneuver the hook 73 out through the aperture 66. A replacement tine can be introduced as described for the original installation.

As shown in FIG. 5, the bat fastening and shaft mounting is offset. For some services it is preferred to have an aligned mounting. Most of the parts are the same except possibly for center locations of pivot points, but as shown in FIG. 6 the bat 28 has a crank 36 and crank pin 38 and tines 68, as before. However, the bat shaft 24, for example, is disposed in a bifurcated bracket 76 that straddles the bat and is secured in place by a through bolt 77. Since the angularity of the master rod 51 or side rods 53 with respect to the crank 36 may be quite flat near the opposite ends of the stroke, there may be flexure over center, especially when the machine is old and worn. If desired, stops 78 and 79 can be interposed between the rods 51 and 53 and the crank 36, or in equivalent positions, to preclude any overcenter motion.

There has been provided a reel mechanism that is considerably lighter than reels heretofore utilized under similar operating conditions, one that is effective to provide the desired amount of feathering motion without any excess thereof, is simple mechanically without intermediate bat interrupting bearings, and that is relatively easy and inexpensive to construct, lubricate and maintain while working under heavy loads.

I claim:

1. A harvester reel comprising a frame, a shaft, means on said frame for journalling said shaft for rotation relative to said frame about a main horizontal axis, a pair of axially spaced mounting arms fixed on and extending outwardly of said shaft, a bat, means on said arms for journalling said bat adjacent the outer ends of said arms for movement about a bat axis parallel to said main axis, a crank pin having a crank pin axis, means engaging said pin and said bat for fixing said crank pin to said bat with said pin axis eccentric from and parallel to said bat axis, a circular guide having a guide axis, means engaging said frame and said guide for fixing said guide on said frame with said guide axis eccentric from and parallel to said main axis, a follower journalled on said circular guide, and a rod having a connection to said follower and to said crank pin.

2. A device as in claim 1 in which said connection is fixed.

3. A device as in claim 1 in which said connection is a pivot about a connection axis parallel to said main axis.

4. A device as in claim 1 in which said crank pin axis rotates about said bat axis through approximately one hundred seventy degrees.

5. A device as in claim 1 in which said bat is substantially planar and occupies instantaneous planar positions substantially parallel to each other during rotation of said main shaft through approximately one hundred seventy degrees.

6. A device as in claim 1 in which said mounting arm is tangent to said shaft.

7. A device as in claim 1 in which said shaft is a tube, each of said mounting arms includes a pair of struts at one end tangent to said tube at circumferentially spaced points and at the other end fixed relative to each other.

8. A device as in claim 1 in which said circular guide includes a plurality of rollers mounted with the periphery of each tangent to a circle common to all of said rollers.

9. A device as in claim 1 in which said bat in transverse cross-section is a box defined by spaced walls, and a tine engaging said bat through said spaced walls and projecting therefrom.

* * * * *